United States Patent
Van Rooij et al.

(10) Patent No.: US 6,739,994 B1
(45) Date of Patent: May 25, 2004

(54) CONTROL SYSTEM FOR A CONTINUOUSLY VARIABLE V-BELT TRANSMISSION

(75) Inventors: Jacobus Hubertus Van Rooij, Nuenen (NL); Theodorus Petrus Cadée, Asten (NL)

(73) Assignee: Gear Chain Industrial, BV (NL)

( * ) Notice: Subject to any disclaimer, the term of this patent is extended or adjusted under 35 U.S.C. 154(b) by 0 days.

(21) Appl. No.: 09/763,404

(22) PCT Filed: Aug. 25, 1999

(86) PCT No.: PCT/NL99/00531

§ 371 (c)(1),
(2), (4) Date: May 23, 2001

(87) PCT Pub. No.: WO00/12918

PCT Pub. Date: Mar. 9, 2000

(30) Foreign Application Priority Data

Aug. 27, 1998 (NL) .............................................. 1009954

(51) Int. Cl.[7] .............................................. F16H 61/00
(52) U.S. Cl. .......................................... 474/28; 474/18
(58) Field of Search .............................. 474/16, 18, 28, 474/33, 35; 418/33, 35

(56) References Cited

U.S. PATENT DOCUMENTS

| | | | | |
|---|---|---|---|---|
| 5,052,909 A | * | 10/1991 | Hertzer et al. ............... | 425/150 |
| 5,295,915 A | * | 3/1994 | Friedmann .................... | 474/18 |
| 5,486,106 A | * | 1/1996 | Hehl ........................ | 264/40.5 |
| 5,959,420 A | * | 9/1999 | Boberg et al. .............. | 180/282 |

FOREIGN PATENT DOCUMENTS

WO     WO 97/05387    * 2/1997    ........... F04B/49/06

* cited by examiner

Primary Examiner—David A. Bucci
Assistant Examiner—Vicky A. Johnson
(74) Attorney, Agent, or Firm—Ostrolenk, Faber, Gerb & Soffen, LLP

(57) ABSTRACT

A continuously variable transmission, having a first pair of conical disks including an axially moveable disk and an axially non-movable disk whereby a running radius of the first pair of disks is changeable, a second pair of conical disks including an axially movable disk and an axially non-movable disk whereby a running radius of the second pair of disks is changeable, and an endless transmission element arranged to couple the first pair of disks with the second pair of disks. A first hydraulic actuator in operative connection with the movable disk of the first pair of disks for axially moving the disk, the first actuator having an inlet port, and a second hydraulic actuator is in operative connection with the movable disk of the second pair of disks for axially moving the disk, the second actuator having an inlet port. A first, four-quadrant controllable pump-motor has a first port connected to the inlet port of the first actuator, and a second port connected to the inlet port of the second actuator. The first pump-motor is operative to control a pressure ratio between the inlet ports of the actuators. A second, two-quadrant controllable pump-motor has an inlet port connected to a hydraulic medium source, and an outlet port connected to the inlet port of one of the actuators. The second pump-motor is operative to control tension in the endless transmission element. The output of the pump-motors is controlled and varied based on demand.

11 Claims, 7 Drawing Sheets

CONTROL SYSTEM FOR A CONTINUOUSLY VARIABLE V-BELT TRANSMISSION

BACKGROUND OF THE INVENTION

The invention relates to a control system of the kind as described in the preamble of claim 1 and as known as such from EP-A-0 423 536.

In this known transmission system the outlet port of the supply pump which supplies the hydraulic medium under pressure from a medium supply is connected via two one-way valves with the respective inlet ports of each of the actuators, which are thus connected with each other only via the first hydraulic pump-motor and from which no hydraulic medium can flow back to the supply.

This known transmission has two principle drawbacks. The first drawback is that this transmission can only work in a very narrow range of transmission ratios at both sides of the transmission ratio: one. This results from the fact that, when the transmission ratio deviates largely from the value one, thus when the running radius of the transmission medium on the one of the pair of conical disks is small, and the same on the other pair large, the adjustment of the conical disks—in which the disks with the smaller running radius move towards each other and same with the greater running radius move away from each other—the distance over which the disks must be adjusted with respect to each other in axial direction is unequal for the respective pairs of conical disks; of course then also the respective amounts of displaced hydraulic medium are unequal. In this know device, however, as a result of the one-way valves no hydraulic medium can flow back to the supply volume so that the control system will inevitably lock itself up when such adjustments take place.

A second drawback is the fact that the second hydraulic supply pump is a simple supply pump combined with a spring biased shunt valve, the pump being driven constantly. As long as the transmission ratio does not change all the energy supplied by the pump is converted in the bias valve in useless heat. Thus the pump provokes very great energy losses which greatly reduce the total efficiency of the transmission.

SUMMARY OF THE INVENTION

The aim of the invention is to improve a control system of the kind as mentioned above in such a way that it can be operated over a very large range of ratios with a minimum of losses. This aim is obtained with the measures according to the characterizing part of claim 1.

As a result of the open connection between the outlet port of the two-quadrants controlled second pump-motor and the inlet port of one of the actuators medium can be supplied from, and returned to, the supply volume, ensuring that the in four-quadrants controlled, first pump-motor can cover without any problems the whole range of ratios of the transmission, while the fact that the second pump-motor can be controlled in two quadrants results in that this second pump-motor must only set a minimum pressure level for one of the actuators, which has a value only a little above the value with which under the present transmission ratio and torque conditions slipping of the transmission means would occur, the volume flow which must be supplied is very small, not more than necessary to compensate the difference in volume flow from the one actuator to the other with added to it the internal and external leak losses which might occur in the transmission or in the control system. When the transmission ratio remains constant this volume flow remains restricted to only the amount which is necessary to compensate occurring leak losses. As a result the energy consumed by the second pump-motor will only be very small and the total efficiency of the transmission will be increased in proportion thereto.

It is observed that the measures according to the invention result into a transmission of which the control and supply system is made up with simple, relatively cheap and compact, electric motors which, with the present prior art can be operated and controlled quite dependable. It is not necessary any more to use the known hydraulic pump, driven by the engine which drives the transmission and which provokes quite heavy losses.

The preferred embodiment according to claim 5 has the advantage that the second pump-motor will always be connected to the actuator which carries the lowest hydraulic setting pressure so that this second pump-motor, irrespective of the direction in which the energy flow passes through the transmission and irrespective of the actual transmission ratio, needs only to supply the lowest pressure level, thus resulting in a further reduction of energy taken up by this pump-motor.

BRIEF DESCRIPTION OF THE DRAWINGS

The invention will be elucidated on the hand of examples shown in the drawings. In these drawings similar parts are indicated by the same reference numerals. In the drawings show.

DETAILED DESCRIPTION OF THE PREFERRED EMBODIMENTS

Figure 1:
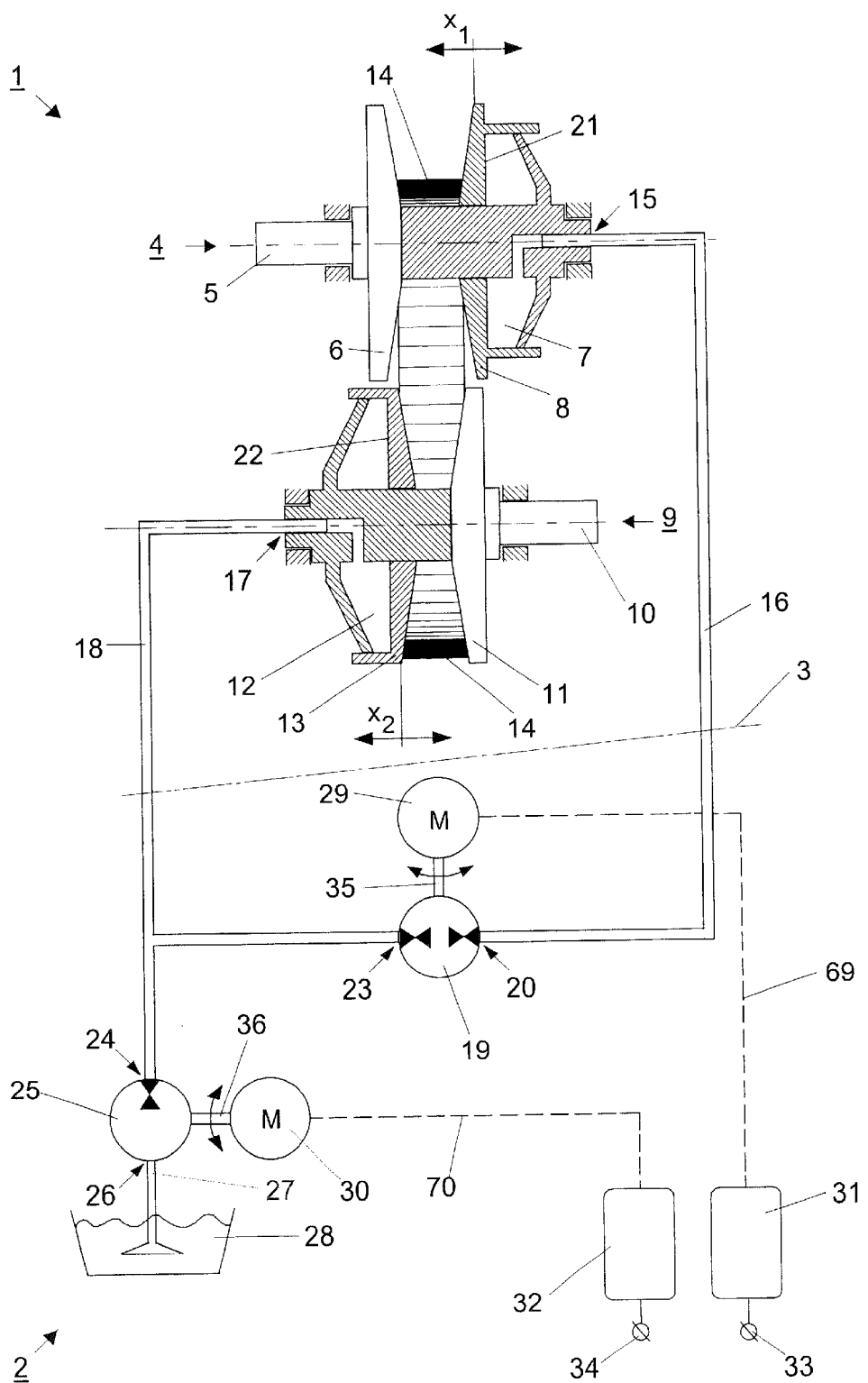
FIG. 1 a first embodiment of a CVT provided with the control system according to the invention.

FIG. 1 shows a combination of a continuously variable transmission 1, and, beneath the dividing line 3, the control system 2 thereof. The continuously variable transmission 1 is provided with a first pair of disks 4, comprising a disk 6 which is fixed to the shaft 5 and a movable disk 8 which can move with respect to the shaft 5 by pressure in a first chamber 7 in axial direction, indicated with the arrow $x_1$. The disk 8, with the piston surface 21 with surface $A_1$ coupled thereto is in combination with the chamber 7 the first setting means of the CVT 1. The actuator is via the port 15 connected with the conduit 16 which goes to the control system 2.

The CVT is furthermore provided with a second pulley with two disks 9, which are mounted on a shaft 10 and comprising the disk 11, fixed to the shaft 10, and a axially, in the direction of the arrow x2 displaceable second disk 13 being under the influence of the pressure in the second chamber 12. The disk 11 with the piston surface 22 with surface $A_2$ coupled thereto is in combination with the chamber 12 the second actuator of CVT 1. This actuator is via the inlet port 17 connected to the conduit 18 which goes to the control System 2.

The chambers 7 and 12 are filled with a suitable hydraulic medium, for instance oil. Between the disks 6, 8 and 11, 13 there is an endless transmission means with a trapezoid shaped cross section 14. This transmission means can be a flexible strap, belt or chain or a non-flexible massive ring.

Figure 2:
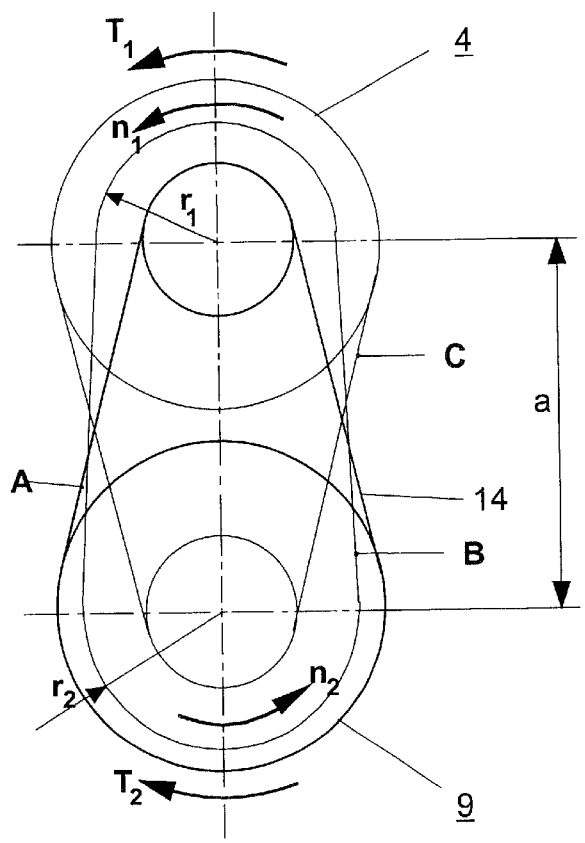
FIG. 2 a schematic view of a CVT in which some of the various possible positions of the endless transmission means which runs between the pairs of conical disks are shown.

In FIG. 2 are shown the first extreme position "A", an arbitrary in between position "B" and the other extreme position "C" which the transmission means 14 can have between the pair of disks 4 and 9. Furthermore this figure shows the rotational speeds $n_1$ and $n_2$, the torques $T_1$ and $T_2$ of the disk pairs 4 and 9. Furthermore this figure shows the running radii of the transmission means 14 on the pair off disks. For the arbitrary intermediate position these are indicated with $r_1$ on the disks 4 and with $r_2$ on the disks 9. Generally $r_1$ can be both smaller and larger than $r_2$, while in a particular intermediate position, the middle position, the situation can occur that $r_1$ is equal to $r_2$. The disk pairs 4 and 9 are coupled to each other via the transmission means 14. Apart from a small elastic stretch which will commonly occur during the operation the circumferential length L of the transmission means will remain constant. There is thus a nearly fixed relationship which is determined by the geometric structure of the CVT between the running radii $r_1$ and $r_2$ and for this relation can be shown that it is given, with a good approximation, by the formula:

$$r_2 = r_1 - \frac{\pi}{2} \cdot a + \sqrt{\frac{1}{4}\pi^2 \cdot a^2 - 2 \cdot a^2 + a \cdot L - 2\pi \cdot a \cdot r_1},$$

in which a is the center distance between the pair of disks, as shown in FIG. 2. This formula clearly shows that the relation between $r_1$ and $r_2$ is not linear.

Figure 3:
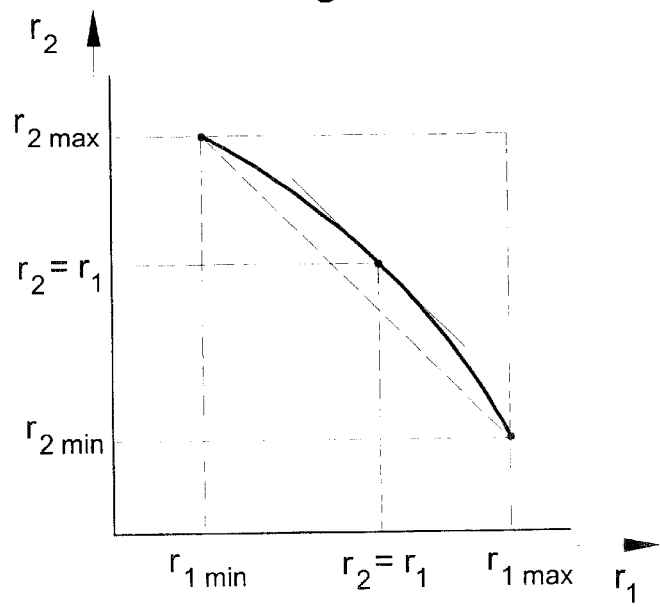
FIG. 3 a diagram which shows the connection between the running radii of the transmission means on the conical disks.

FIG. 3 is a graphic representation of this relation; the running radius $r_1$ is taken along the horizontal axis and the running radius $r_2$ on an equal scale along the vertical axis. The respective running radii in the extreme positions are provided with the index min and max respectively. From this drawing can be concluded that during the change of the transmission ratio, as defined by the ratio between $r_1$ and $r_2$ the smaller of the two running radii changes more than the larger. On the point $r_1=r_2$ the tangent to the curve includes an angle of 45° and only around this point the running radii will change in an equal amount. In this point the transmission ratio is one.

Influencing the tension in the transmission means 14 and the transmission ratio of the CVT, as defined by the running radii of the transmission means 14 on the pair of disks, is done by means of the control system 2 by changing the pressure in the chambers 7 and 12 and by controlling the oil flow to and from these chambers. When changing the transmission ratio in the one direction both disks 8 and 13 move to the left, so that the volume of the chamber 7 increases and the volume of the chamber 12 decreases. When changing the transmission ratio in the opposite sense both disks 8 and 13 move to the right, decreasing the volume in chamber 7 and increasing the volume in chamber 12. The control system 2 is via two conduits 16 and 18, which go to the chambers 7 and 12, connected to the CVT 1.

The first embodiment of the control system 2 as shown in FIG. 1 comprises the hydraulic pump-motor 19 with ports 20 and 23, connected via the conduits 16 and 18 respectively between the two chambers 7 and 12. This pump-motor makes it possible to displace medium from chamber 7 to chamber 12, and opposite. As a result the volume of the amount of medium present in the respective chambers will change and the disks 8 and 13 which are connected to the chambers will move in axial direction, as a result of which the position of the transmission means with respect to the pair of disks 4 and 9 will change. When displacing medium from chamber 7 to chamber 12 the transmission means will move in the direction of the extreme position which is indicated in FIG. 2 by "C", while when displacing the medium in the opposite direction the transmission means will move in the direction of the other extreme position "A". In this way the transmission ratio, defined as the ratio between the running radii which the transmission means has on both thereof disks can be varied continuously.

It is observed that it is of great importance that the amount of medium moved to and from chambers 7 and 12 respectively will generally be unequal to each other as a result of the herein above discussed non-linear relation between the running radii. The displacements in the direction $x_1$ and $x_2$ of the movable disks 8 and 13 respectively are proportional to the changes of the running radii $r_1$ and $r_2$ respectively and bring about an unequal displaced volume. This is also the case when the piston surfaces $A_1$ and $A_2$ are mutually equal. Under some circumstances the amount of medium which flows from one of the chambers 7 or 12 can be more than the amount of medium which can be taken up by the other chamber. Thus somewhere in the circuit which comprises the chambers 7 and 12, conduits 16 and 18 and pump-motor 19 there must be a possibility for the medium to flow back to the supply volume. In the known device according to the prior art such a back flow is blocked by the presence of one way valves so that under these circumstances a change of transmission ratio is only possible in a very limited range around the position in which $r_1=r_2$. In the control system according to the invention this problem is solved by connecting the outlet port 24 of a second hydraulic pump-motor 25 to one of the conduits 16 or 18 of said circuit, so that this pump-motor is connected directly (thus without one-way valve) to one of the ports 15 or 17 of the setting means of the CVT 1. In the present embodiment a connection to the port 17 is chosen. The other port 26 of the pump-motor 25 is connected via the conduit 27 to the supply volume 28. Under circumstances in which medium must flow back to the supply volume the pump-motor acts as a hydromotor and so that now the transmission ratio can be changed. When the amount of medium which leaves one of the chambers 7 and 12 is smaller than the amount of medium which can be taken up by the other chamber the pump-motor 25 acts as a pump and provides the missing amount. In that case medium flows via the conduit 27 from the supply volume 28 to the conduit 18. The pressure on the port 24 of the pump-motor 25 will always be higher than the pressure on the port 26, while the medium can flow in two directions and in opposite direction (from port 26 to port 24). According to the proposal of this invention the pump-motor 25 is of a type which is controllable in two quadrants and has thus preferably a controllable output. In such a pump-motor the possibility exists to control the pressure at the outlet port 24 and to adjust this to the minimum necessary value which depends upon the load and the transmission ratio. When the circumstances are stationary, which means when there is a constant transmission ratio, the advantage is obtained that the output can be reduced to the small output necessary to compensate leak losses which occur in the CVT and the control system 2. Contrary thereto in the known device according to the prior art under such circumstances the total output of the pump is converted in the overflow valve in useless heat. As these losses do not occur anymore the efficiency of the CVT is increased. Furthermore the pump-motor 25 can under those circumstances in which it acts as hydromotor supply energy. The control system gives in principle the possibility to recover this energy, resulting into a further increase of the total efficiency of the CVT.

In the pump-motor 19 the pressure at port 23 during operation can be, in dependence upon the present load and transmission ratio of the CVT, higher as well as lower as same on port 20, while, dependant upon the direction in which the transmission ratio is changed, the flow can be from port 20 to port 23 as well as opposite. The pump-motor 19 is for this reason of a type which is controllable in four quadrants and has preferably a controllable output so that by controlling the volume flow the transmission ratio and the speed with which it changes can be controlled accurately. When in use only the pressure difference between the chambers 7 and 12 as such is present between the ports 20 and 23. When the pump-motor 19 acts as a pump relatively little energy will be consumed, while in the other case, in which it acts as a hydromotor, in principle even the possibility exist to recover energy.

Preferably the pump-motors 19 and 25 have a fixed displacement and are, for instance, simple and cheap gear pumps. The pump-motor 19 is driven via the shaft 35 by means of a driving source 29 which is speed controlled and the pump-motor 25 is driven via shaft 36 by means of torque-controlled driving source 30. These driving sources are preferably of the electrical type and are controlled by means of electrical circuits 69 and 70 respectively by means of the commonly known electrical control units 31 and 32 respectively, of which the terminals 33 and 34 respectively are provided with a control signal which controls the rotational speed and the torque respectively. The pressure difference over the pump-motor 25 is positive only while the volume flow from this pump-motor can be both positive and negative. The control unit 32 is for this reason preferably a two-quadrants control unit. Under circumstances in which there is a volume flow through the pump-motor 25 in the direction of the supply 28 this pump-motor will act as a hydromotor and the driving source 30 as a generator, so that the control unit 32 can in principle supply electrical energy back. In the pump-motor 19 both the pressure difference and the direction of the flow can be positive or negative. The control unit 31 is for this reason preferably a four-quadrants control and in principle electrical energy can be generated when the pump-motor 19 acts as a hydromotor and the driving source 29 acts as a generator. In their most simple embodiment the control units 31 and 32 respectively comprise a voltage and current control unit respectively.

Apart from the advantage of an increase of the efficiency of the CVT as a whole such a control system has the big advantage that it is simple and can be implemented at low cost. Furthermore it is excellently suited to be controlled by an electronic system which preferably comprises a microprocessor, and which supplies to the terminals 33 and 34 the necessary electrical control signals.

This electronic system is preferably connected to sensors which supply signals representing the actual values of the transmission ratio and the transmitted torque respectively. To determine the transmission ratio these sensors preferably consist of rotational speed sensors coupled with the pair of disks 4 and 9 or of a position sensor which is coupled with one of the movable disks 8 or 13. To determine the transmitted torque one will preferably use a torque sensor in one of the shafts 5 or 10, or use a signal which is supplied by the engine which drives the CVT or by the load which is driven by the CVT. The rotational speed of the pump-motor 19 and the transmission ratio which is dependent thereon, or the speed of change of the transmission ratio are controllable in a simple way in dependence upon the requirements of the energy source and the load connected to the CVT. By means of the signals obtained from the sensors the pressure supplied by the pump-motor 25 can be adjusted to the minimal necessary value by controlling the torque supplied by the driving motor 30.

Dependent upon the use of the CVT it is an advantage that with a control system as described above a further increase of the efficiency of the CVT as a whole is possible by making $A_1$ Unequal to $A_2$. For instance when using the system in a car, in which the pair of disks 4 is connected to an internal combustion engine and a pair of disks 9 is coupled to the driving wheels the absolute pressure in the chanters 7 and 12, as well as the pressure difference between these chambers will be highest in the position "A" of the transmission means 14. Furthermore when accelerating full throttle the speed with which the transmission ratio changes will be highest in the position "A" and, when the speed of the car increases, will smoothly decrease until position "C" is reached. As a result the amount of energy used by the control system will be highest in the position "A".

It can be deducted from FIG. 3 that when $A_1=A_2$, the amount of oil which flows to chamber 7 is greater than the amount of oil which leaves chamber 12. When $A_1$ is greater than $A_2$ this difference decreases, so that the volume to be supplied by pump-motor 19 decreases, while furthermore the pressure to be supplied by this pump-motor also decreases. By both these effects the energy which must be supplied by this pump-motor decreases, so that the efficiency of the CVT as a whole is still further increased.

Figure 4:
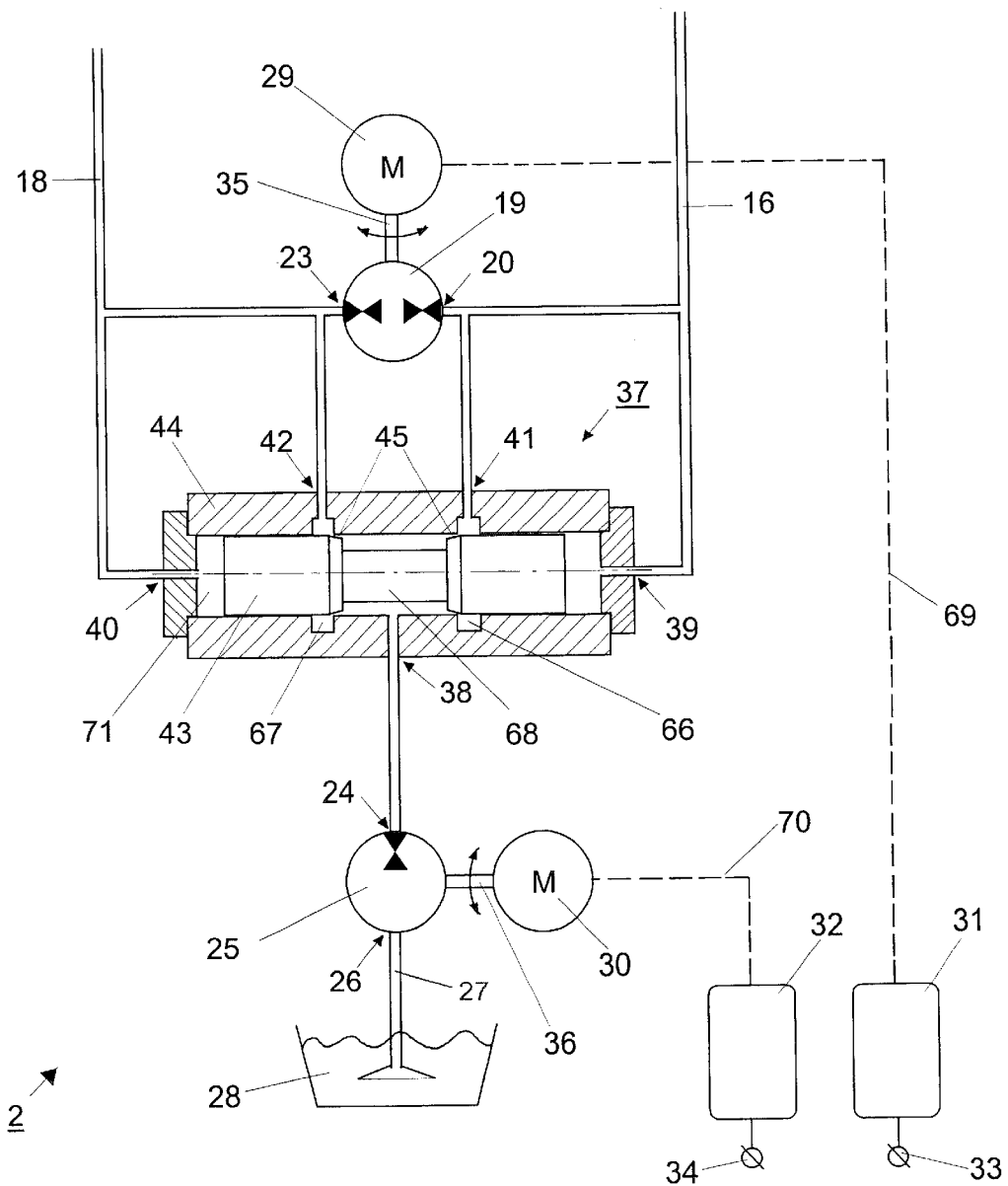
FIG. 4 shows a relevant part of a preferred embodiment of the control system with an automatic setting valve according to the invention.

FIG. 4 shows a relevant part of the preferred embodiment of the control system according to the invention in which a still further decrease of the losses in the control system is obtained. The implementation and control of the pump-motors 19 and 25 is equal to the ones already discussed on the hand of FIG. 1. In this embodiment however, one uses an automatic selecting valve 37 parallel to the pump-motor 19, provided with a supply port 38 supplied with medium under a basic pressure, by a pump-motor 25. The switch-over valve 37 is furthermore provided with control ports 39 and 40, connected to the conduits 16 and 18 and outlet ports 41 and 42, also connected to the conduits 16 and 18 and between which the pump-motor 19 is connected.

The control system 2 operates in these embodiments in such a way that the position of the valve body 43 which can shift in the bore 71 of the valve housing 44 is determined by the pressure difference in the chambers 7 and 12, so that always the lowest of the pressure in the chambers 7 and 12 will be equal to the pressures on the supply port 38. This means that in the shown situations of FIG. 2 the pressure of the pump-motor 25 at the positions between "A" and more or less the middle position, in which the pressure in chamber 7 is lower than the pressure in chamber 12 will operate in chamber 7 and in the area between the middle position and position "C", in which the pressure in chamber 7 is higher than the pressure in chamber 12, in chamber 12. Thus the pressure supplied by pump-motor 25 will automatically be present in the correct chamber 7 or 12. As the pressure of the pump-motor 19 is now under all circumstances the lowest of these two pressures the energy taken up by this pump-motor will be less and the efficiency of the CVT as a whole will be increased. Furthermore the pressure of the pump-motor 25 is active for nearly each position of the transmission means in the chamber of the pair of disks on which the transmission means has at this moment the smallest running radius. On this pair of disks there is the greatest risk of slipping of the transmission means and it is an advantage that the pressure in this chamber is directly controlled and can thus be adapted accurately to the momentary values of the transmission ratio and the transmitted torque $T_1$ or $T_2$.

The dimensions of the valve body 43 are furthermore such that in the middle position of the valve the supply port 38 via the space around the narrower middle part 68 of the valve body is at least connected to one of the, ring shaped, outlet port spaces 66 and 67 which are in connection with one of the outlet ports 41 or 42. Furthermore the edges of the valve are of such a shape that there is a smooth connection with the outlet ports, for instance by providing the edges of the valve body or of the valve housing with beveled sides 45.

Figure 5:
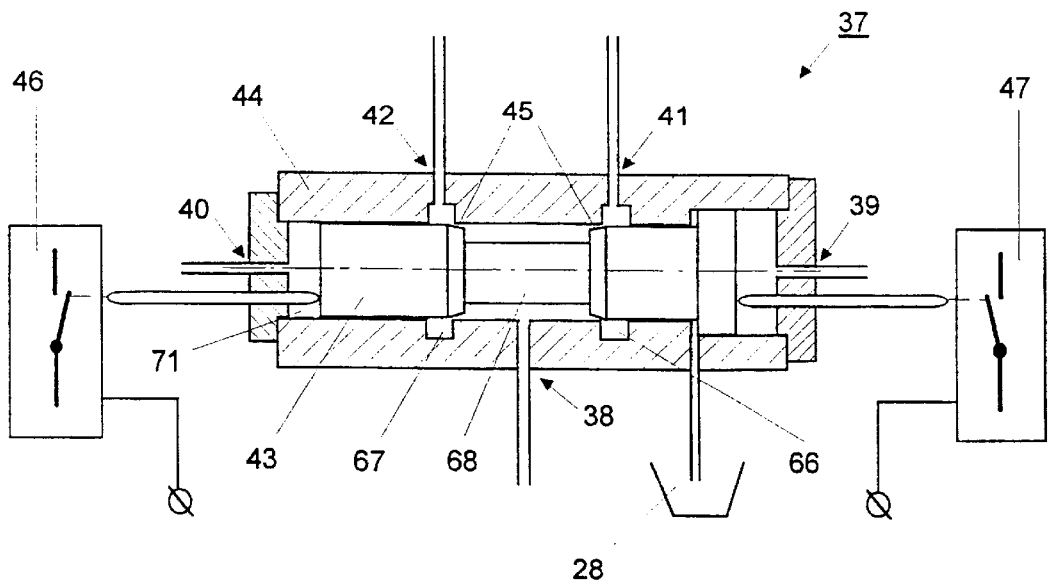
FIG. 5 a further embodiment of the valve shown in FIG. 4.

FIG. 5 shows a further embodiment of the selecting valve 37, particularly suitable to be used in those CVT systems in which the respective actuators of the pair off disks have unequal surfaces $A_1$ and $A_2$, in which then, for instance, the right hand head surface of the valve body 45, in case $A_1<A_2$, is increased. By means of end switches 46 and 47, on both the end surfaces of the valve body, signals can be obtained which indicate which of the chambers 7 and 12 at a particular moment is connected with the pump-motor 25, and to adapt the control signal supplied to terminal 34 to the surface of the relative piston. Of course each other kind of suitable position sensor can be used to determine the position of the valve.

Figure 6:
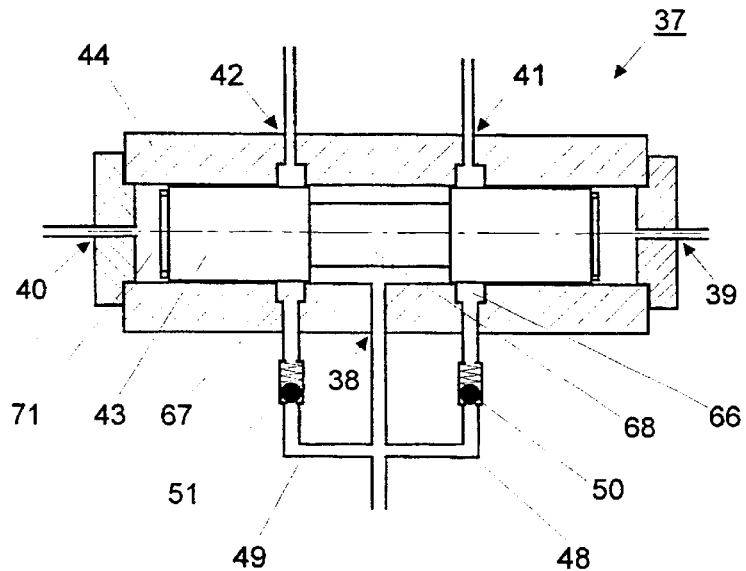
FIG. 6 another embodiment of the valve shown in FIG. 4.

FIG. 6, shows an embodiment of the selecting valve 37 in which in particular the leakage losses in the middle position of the valve body 43 will be minimal. The dimensions of the valve body 43 are such that there is in the middle position no direct connection between the supply port 38 and the outlet ports 41 or 42. In this position the pressure supplied by the pump-motor 25 is brought to one of the outlet ports 41 or 42 via the conduits 48 and 49 with therein the one-way valves 50 and 51 which only allow a volume flow in the direction of the outlet ports. In this way a connection is made with the port which has at that moment the lowest pressure.

Figure 7:
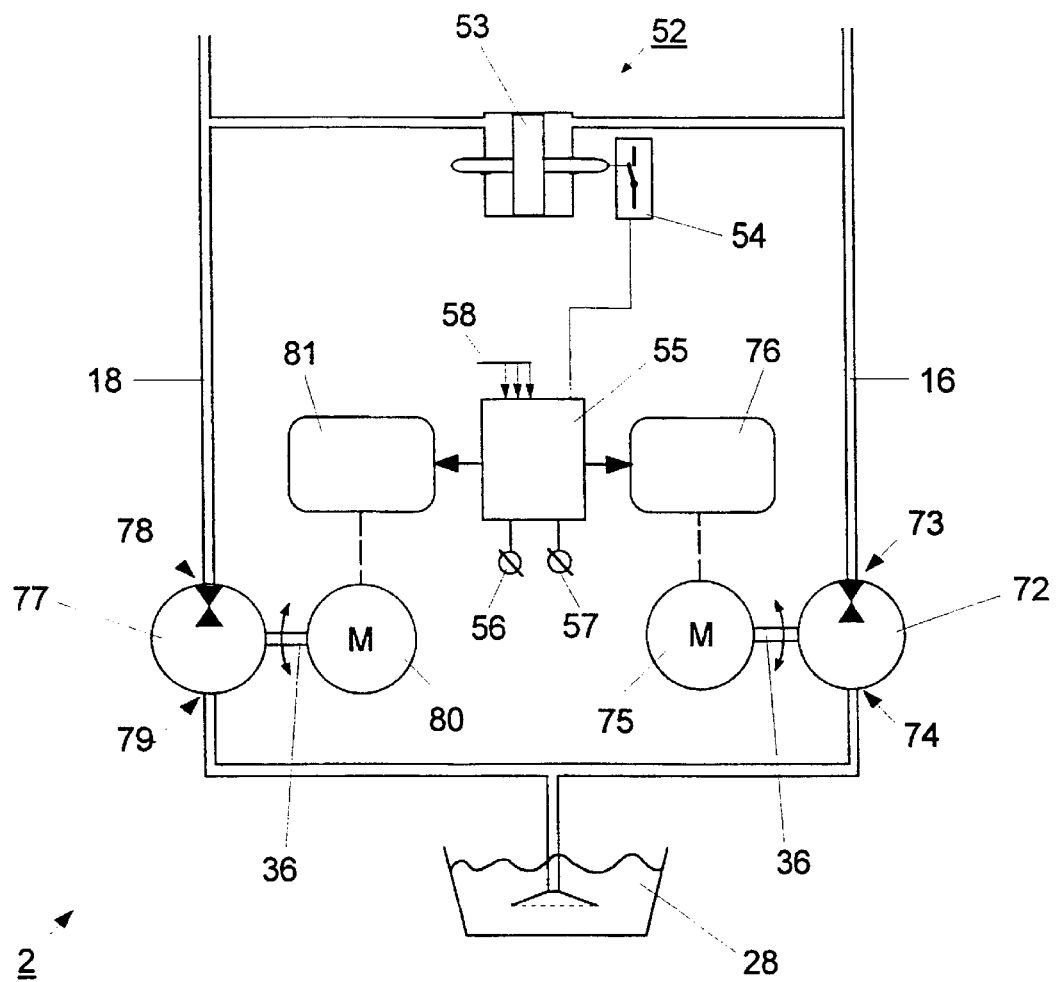
FIG. 7 shows a relevant part of the still another embodiment of the control system according to the invention.

FIG. 7 shows a relevant part of still another embodiment of the control system 2 according to the invention. In this embodiment the first and second pump-motors are replaced by a third pump-motor 72 and a fourth pump-motor 77. The outlet ports 73 and 78 of the pump-motors 72 and 77 are connected directly to the chambers 7 and 12 via the conduits 16 and 18. In this case one pump-motor acts as pump-motor with which an independent pressure level can be set in one of the chambers while the other pump-motor controls the transmission ratio by controlling the volume flow. In both pump-motors the pressure at the outlet ports 73 and 78 respectively is in use always higher than the pressure at the inlet ports 74 and 79 respectively so that both pump-motors are of the type which is controllable in two quadrants. Preferably this system comprises a pressure difference sensor 52, for instance implemented by a valve body 53 which can be shifted under the influence of the pressure difference in the conduits 16 and 18 and which is combined with at least one end switch 54, connected to a function indicator 55 by means of which the functions of the pressure control and the control of the transmission ratio can be delegated to either the pump-motor 72 or 77. If necessary the pressure control surfaces on both sides of the valve body can be different. The operation of the function allocation element is such that the function of controlling the pressure is allocated to that pump-motor which is at that moment connected to the chamber with the lowest pressure while the other pump-motor is connected to the other chamber. In the case in which the pump-motors are electrical motors a torque control signal, supplied to terminal 56, will when the pressure in conduit 18 is higher than the pressure in conduit 16 be supplied to the control unit 76 while at the same time a rotational speed control signal present at terminal 57 is supplied to the control unit 81. In the other case, in which the pressure in conduit 18 is lower than the pressure in conduit 16, the control signals supplied to the control units 31 and 32 are switched. The advantage of such a control signal is that the pump-motor which controls the pressure is always connected to the chamber in which there is the lowest pressure, thus resulting into a saving of energy. Furthermore this resulting embodiment, too, gives in principle the possibility to recover energy in the case in which medium flow back via the pump-motors 72 and 77 to the supply volume 28 and the pump-motors act as hydromotor, so that the efficiency of the CVT as a whole is increased.

In an other embodiment based on this principle the pressure difference sensor 52 is omitted but the function allocating element 55 is via its inputs 58 connected to sensors supplying a value which represents the actual value of the transmission ratio and the transmitted torque. From these signals can be deducted on the hand of characteristics known as such, in which chamber the pressure has the lowest value, after which a function allocation to the correct pump-motor follows.

Figure 8:
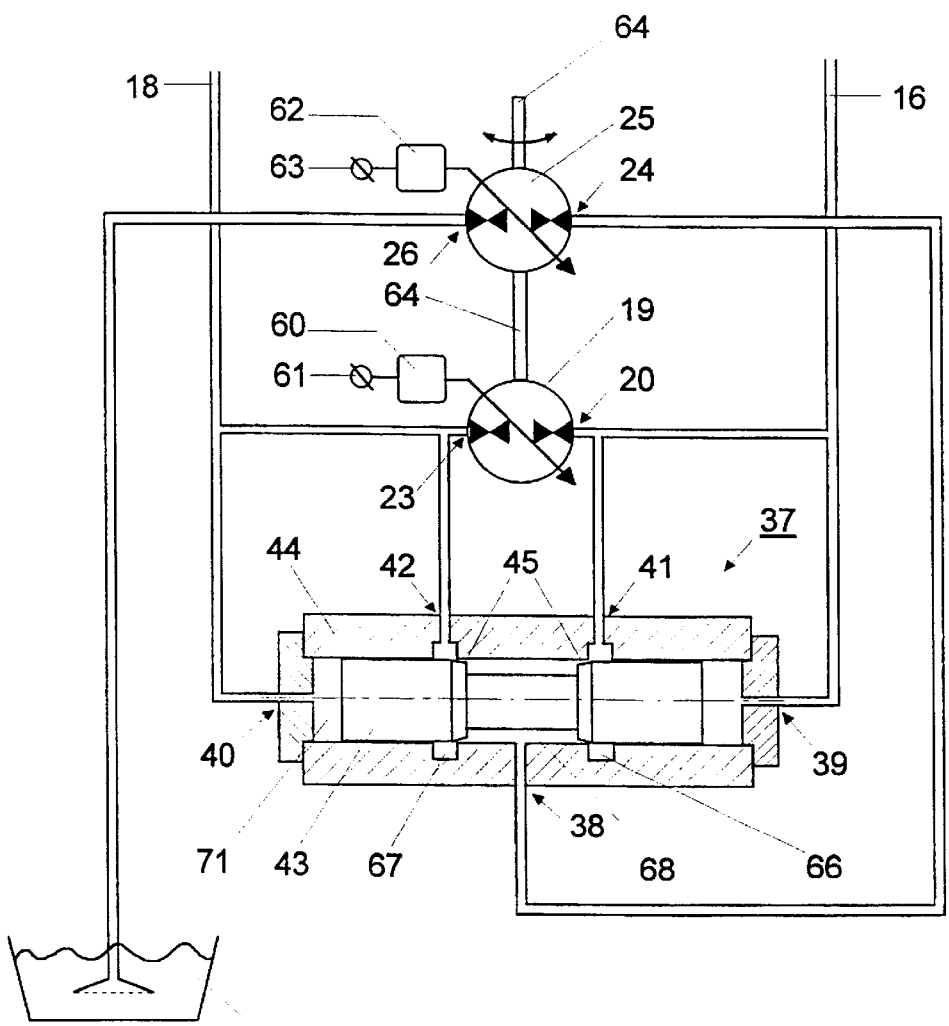
FIG. 8 shows a relevant part of the further embodiment of the control system according to the invention.

In still other embodiments of the control system according to the invention the pump-motors 19 and 25 are implemented as pump-motor with a variable stroke-volume. Such pump-motors can be implemented as a pump-motor, known from the prior art with at variable stroke-volume of which under control of a supplied mechanical, electrical hydraulical control signal either the volume flow or the pressure, or one of these values can be controlled. FIG. 8 shows schematically a relevant part of a control system according to the invention with pump-motors 19 and 25, which are implemented in this way. Pump-motor 19 has a control unit 60, with an input 61 to which a volume flow control signal is supplied which, by varying the stroke-volume controls the volume flow. Pump-motor 25 is provided with a control unit 62 and with an input 63 which is supplied with a pressure control signal controlling, by varying the stroke-volume, the pressure. The pump-motors are preferably driven via a common shaft 64 which can be coupled to the shafts 5 or 10 of the CVT. Otherwise this embodiment operates as described for the embodiment of FIG. 4. An advantage is that under the circumstances in which the one pump-motor acts as a hydromotor and the other as a pump the energy which is delivered by the one pump-motor can be used to drive via the common shaft the other pump-motor so that the total amount of consumed energy decreases and the efficiency of the CVT as a whole is increased. Of course the pump-motors 19 and 25 can be implemented in a similar way in the embodiments according to the FIGS. 1–7 and 9. This embodiment too is very well suited to be controlled by an electronic system, preferably with a microprocessor, which supplies in this case the volume flow and pressure signals to the inputs 61and 63 respectively.

Figure 9:
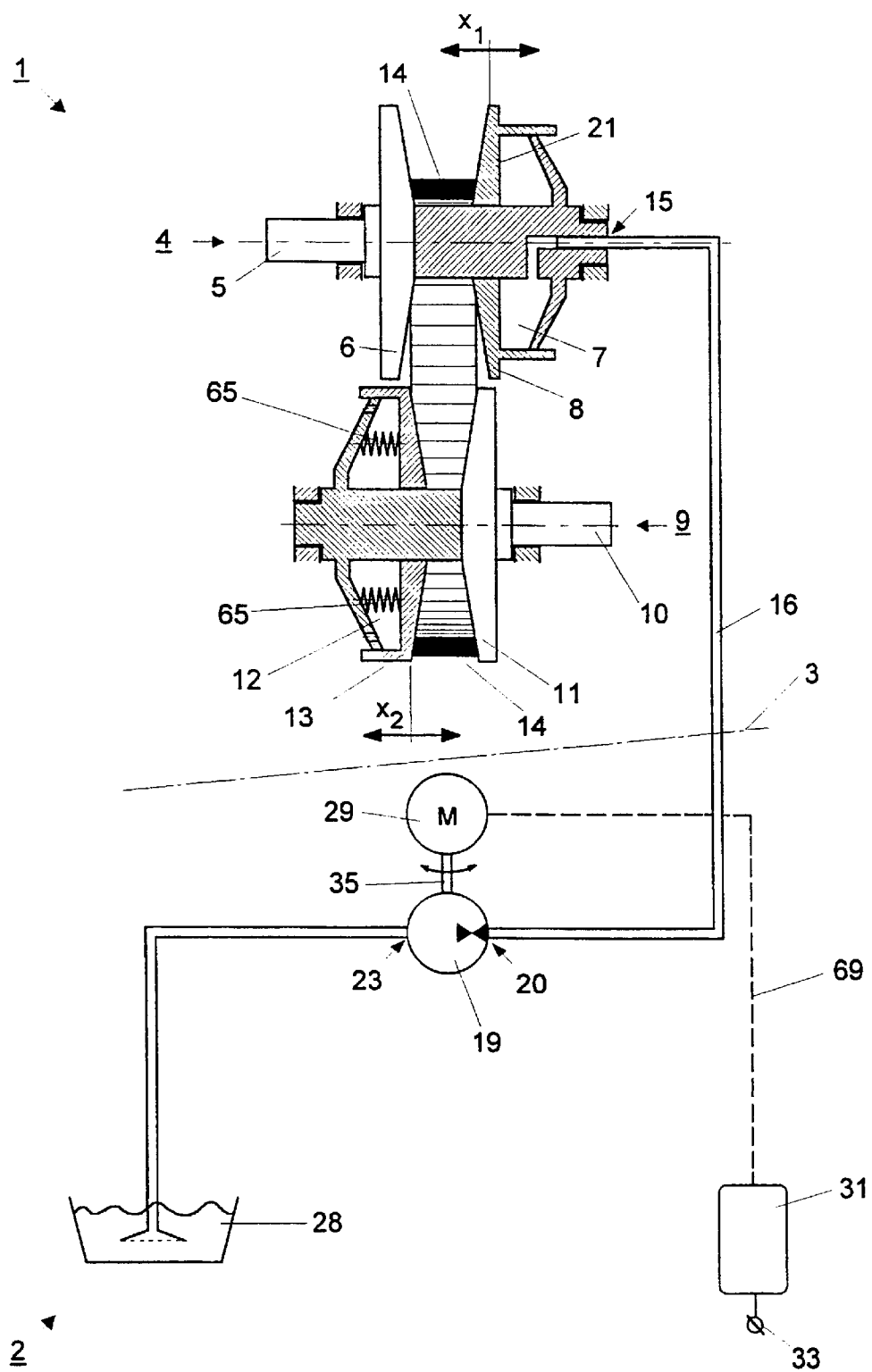
FIG. 9 shows a simple embodiment of the control system with CVT according to the invention.

FIG. 9 shows a simple embodiment of the control system according to the invention in which the pump-motor 25 is omitted. There is no hydraulic medium in the chamber 12. It is replaced by the springs 65 with which the transmission means is tensioned. Pump-motor 19 is in this embodiment via the port 23 connected directly to the supply volume 28 and is of the type which can be controlled in two quadrants. By means of the pump-motor 19 the transmission ratio by the speed with which it changes can be controlled by supplying a rotational speed control signal to terminal 33 of the control system 31. The advantage is that the control system 2 can be simple and cheap in case the difference between the utmost limit positions "A" to "C" is small and the load of the CVT or the transmission ratio varies only a little during the operation of the transmission. The losses in the control system are small so that the efficiency of the CVT as a whole is high.

What is claimed is:

1. A continuously variable transmission, comprising:
   a first pair of conical disks including an axially moveable disk and an axially non-movable disk whereby a running radius of the first pair of disks is changeable;
   a second pair of conical disks including an axially movable disk and an axially non-movable disk whereby a running radius of the second pair of disks is changeable;
   an endless transmission element arranged to couple the first pair of disks with the second pair of disks;
   a first hydraulic actuator in operative connection with the movable disk of the first pair of disks for axially moving the disk, the first actuator having an inlet port;
   a second hydraulic actuator in operative connection with the movable disk of the second pair of disks for axially moving the disk, the second actuator having an inlet port;
   a first, four-quadrant controllable independent pump-motor combination having a first port connected to the inlet port of the first actuator, and a second port connected to the inlet port of the second actuator, the first pump-motor combination being operative to control a fluid flow between the inlet ports of the actuators;
   a second, two-quadrant controllable independent pump-motor combination having an inlet port connected to a hydraulic medium source, and an outlet port connected to the inlet port of one of the actuators, the second pump-motor combination being operative to control tension in the endless transmission element;
   means for controlling and varying output of the second pump-motor combination in dependence on a required operating tension in the endless transmission element; and
   means for controlling and varying a quantity and direction of fluid flow through the first controllable independent pump-motor combination respectively to and from the first and second actuators in dependence on a required change in the respective running radii of the pairs of disks controlled thereby, both the first and second pumps being driven discontinuously.

2. A continuously variable transmission according to claim 1, wherein the first pump-motor combination comprises a combination of a hydraulic displacement pump coupled to a first electric motor, controlled by a four-quadrant control, and the second pump-motor combination comprises a combination of a hydraulic displacement pump coupled to a second electric motor, and controllable by a two-quadrant control.

3. A continuously variable transmission according to claim 2, wherein the first electric motor is controlled in its rotational speed.

4. A continuously variable transmission according to claim 2, wherein the second electric motor is controllable as to delivered torque.

5. A continuously variable transmission according to claim 1, and further comprising a controllable selector valve arranged to connect the outlet port of the second pump-motor combination to the inlet port of one of the actuators runs, the valve having outlet ports that are respectively connected with the inlet port of one of the actuators, said valve being controlled during operation so that an inlet port of the selector valve is connected with an outlet port of the two actuators which carries a lowest pressure.

6. A continuously variable transmission according to claim 5, wherein the selector valve comprises a valve housing and a valve body slidingly accommodated in a bore in the valve housing, the valve body having a narrowed central part, which, in a center position lies between respective, ring-shaped outlet port spaces which connect to the bore and communicate with an outlet port, and which also covers the inlet port which opens into said bore.

7. A continuously variable transmission according to claim 6, wherein the valve body has respective heads with surfaces that are mutually different, and further comprising a position sensor coupled to the valve body, the selector valve being arranged to cooperate with the position sensor, the position sensor being operative to produce an output signal that is used to control pressure of the second hydraulic pump-motor combination in dependence upon the position of the selector valve.

8. A continuously variable transmission according to claim 6, wherein a distance between end edges of the narrowed central part of the valve body is greater than a distance of closest end edges of the outlet port spaces cooperating therewith.

9. A continuously variable transmission according to claim 6, wherein a distance between end edges of the narrowed central part of the valve body is no greater than a distance between closest end edges of the outlet port spaces cooperating therewith, each of the outlet ports being connected via a one-way-valve to the inlet port.

10. A continuously variable transmission, comprising:
    a first pair of conical disks including an axially moveable disk and an axially non-movable disk whereby a running radius of the first pair of disks is changeable;
    a second pair of conical disks including an axially movable disk and an axially non-movable disk whereby a running radius of the second pair of disks is changeable, the movable disk being acted upon by mechanical force;
    an endless transmission element arranged to couple the first pair of disks with the second pair of disks;
    a hydraulic actuator in operative connection with the movable disk of the first pair of disks for axially moving the disk, the actuator having an inlet port;
    a two-quadrant controllable pump-motor combination having an inlet port connected to a hydraulic medium source, and an outlet port connected to the inlet port of one of the actuators, the second pump-motor combination being operative to control ratio in the endless transmission element; and
    means for controlling and varying output of the pump-motor combination based on demand so that the pump is driven discontinuously.

11. A continuously variable speed transmission comprising a first pair of conical disks and a second pair of conical disks, mutually coupled by a tensionable endless transmission element, each pair rotatable around a first and a second shaft respectively; one disk of the first pair being movable axially away from and towards the other, stationary, disk of this pair under the action of a first hydraulic actuator provided with an inlet port for a hydraulic pressure fluid, one disk of the second pair being axially movable away from, and towards, the other, stationary, disk under the action of a second hydraulic actuator also having an inlet port for a hydraulic pressure fluid such that, when the movable disk of the first pair is being moved towards the stationary disk of said first pair the movable disk of the second pair is being moved away from the stationary disk of said second pair, and vice versa; the inlet port of the first actuator being connected by means of a hydraulic conduit to a first port of a pump of a four-quadrants controllable first hydraulic pump-electrical motor combination, the inlet port of the second actuator being connected by means of a hydraulic conduit to a second port of the pump of this hydraulic pump-electrical motor combination, and further provided with a second hydraulic pump-electrical motor combination of which the pump has an inlet and an outlet, said combination being two-quadrants controllable, the pump inlet being connected to a source of hydraulic fluid while the pump outlet is connected to either the inlet of the first actuator or the inlet of the second actuator, the arrangement being such that the tension in the endless transmission element is brought about by a hydraulic pressure generated by mean s of the two-quadrants controllable second hydraulic pump-electrical motor combination while the position of the movable disk of the first pair on the one hand and the position of the movable disk on the other hand is determined by the pressure ratio on the respective inlets of the first and the second actuator respectively, such as determined by the, four-quadrants controllable, first pump-electrical motor combination, and further comprising a hydraulic switching valve having a valve body with a cylindrical bore, closed at each end, which accommodates slidingly an elongate cylindrical plunger with a narrowed central part bounded by two shoulders, said plunger defining a first and a second end chamber respectively between each of its outer ends and a respective, opposite, end wall of the valve body, the first end chamber having a port which connects to the inlet port of the first actuator and the second end chamber having a part which connects to the inlet port of the second actuator, a port, opening into the bore at the midpoint between the ends thereof being connected to the outlet of the pump of the second hydraulic pump-electrical motor combination and further comprising two circumferential grooves formed in the surface of the bore symmetrically with respect to said midpoint and at a mutual distance which is greater than the distance of the shoulders which bound the narrow central plunger part, each of said grooves being connected to the port of its most adjacent end chamber.

* * * * *